United States Patent
Qian et al.

(10) Patent No.: US 6,404,900 B1
(45) Date of Patent: Jun. 11, 2002

(54) METHOD FOR ROBUST HUMAN FACE TRACKING IN PRESENCE OF MULTIPLE PERSONS

(75) Inventors: Richard J. Qian, Camas; Kristine E. Matthews, Vancouver, both of WA (US)

(73) Assignee: Sharp Laboratories of America, Inc., Camas, WA (US)

(*) Notice: Subject to any disclaimer, the term of this patent is extended or adjusted under 35 U.S.C. 154(b) by 0 days.

(21) Appl. No.: 09/231,937

(22) Filed: Jan. 14, 1999

Related U.S. Application Data

(60) Provisional application No. 60/090,201, filed on Jun. 22, 1998.

(51) Int. Cl.⁷ .................................................. G06K 9/00
(52) U.S. Cl. ...................................... 382/103; 348/169
(58) Field of Search ................................. 382/171, 103, 382/118, 250, 174, 107, 165, 169, 236; 348/169; 367/125

(56) References Cited

U.S. PATENT DOCUMENTS

| | | | |
|---|---|---|---|
| 4,481,665 A | * 11/1984 | Ota ............................ 382/171 |
| 4,527,283 A | * 7/1985 | Ito et al. ..................... 382/174 |
| 4,903,311 A | * 2/1990 | Nakamura ................... 382/174 |
| 4,912,559 A | * 3/1990 | Ariyoshi et al. ......... 358/261.1 |
| 4,975,960 A | 12/1990 | Petajan |
| 4,975,969 A | 12/1990 | Tal |
| 4,991,223 A | 2/1991 | Bradley |
| 4,998,285 A | * 3/1991 | Suzuki et al. ............... 382/171 |
| 5,086,480 A | * 2/1992 | Sexton ......................... 382/171 |
| 5,095,467 A | * 3/1992 | Olson et al. ................. 367/118 |
| 5,103,484 A | 4/1992 | Stafford et al. |
| 5,150,432 A | * 9/1992 | Ueno et al. .................. 382/250 |
| 5,164,992 A | 11/1992 | Turk et al. |
| 5,187,574 A | 2/1993 | Kosemura et al. |
| 5,280,530 A | 1/1994 | Trew et al. |
| 5,323,470 A | * 6/1994 | Kara et al. ....................... 382/1 |
| 5,430,809 A | 7/1995 | Tomitaka |
| 5,450,504 A | 9/1995 | Calia |
| 5,469,374 A | * 11/1995 | Graham et al. ............. 364/516 |
| 5,592,176 A | * 1/1997 | Vickers et al. .............. 342/359 |
| 5,642,431 A | * 6/1997 | Poggio et al. .............. 382/118 |
| 5,644,386 A | * 7/1997 | Jenkins ....................... 356/4.01 |
| 5,912,980 A | * 6/1999 | Hunke ......................... 382/103 |
| 6,188,777 B1 | * 2/2001 | Darrell et al. .............. 382/103 |

OTHER PUBLICATIONS

J. Yang and A. Waibel, Tracking human faces in real–time, Proc. IEEE Workshop on Applications of Computer Vision, 1996.

A Elefheriadis And A. Jacquin, Automatic face location detection and tracking for model–assisted coding of video teleconferencing sequences at low bit–rates , Signal Processing: Image Communication, No. 7, 1995.

G. D. Hager and P. N. Belhumeur, Real–time Tracking of image regions with changes in geometry and illumination , Proc. Computer Vision and Pattern Recognition, 1996.

* cited by examiner

Primary Examiner—Joseph Mancuso
Assistant Examiner—Abolfazl Tabatabai
(74) Attorney, Agent, or Firm—Robert D. Varitz, P.C.

(57) ABSTRACT

A method for robust human face tracking in the presence of multiple facial images includes taking a frame from a color video sequence as a current input image; filtering the current input image to form a filtered image; estimating the locations and sizes of faces in the filtered image based on a projection histogram of the filtered image; estimating face motion in the filtered image; and outputting the location and size of the tracked faces within the filtered image.

20 Claims, 3 Drawing Sheets

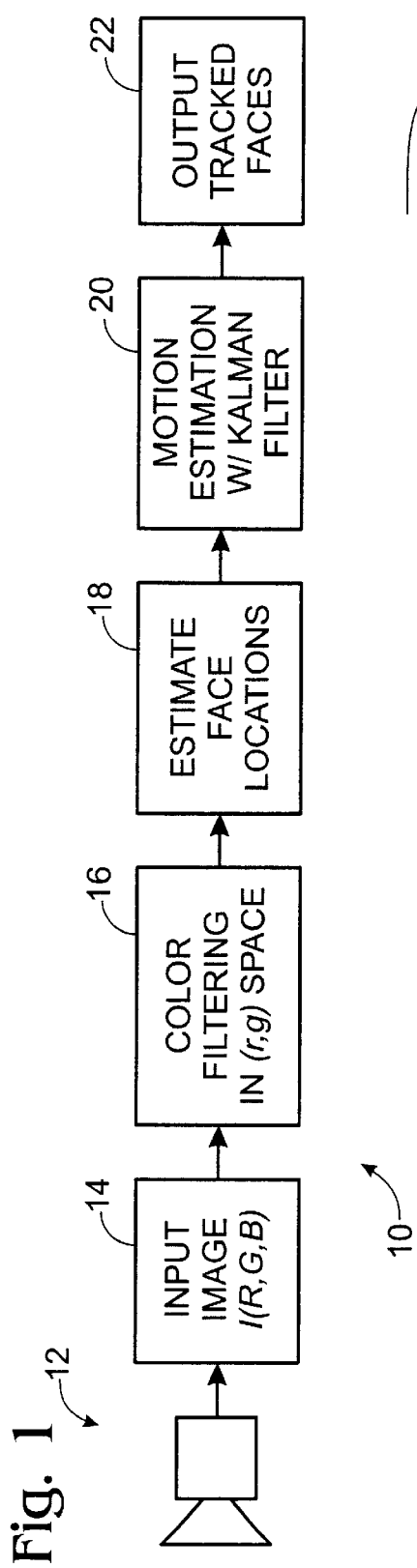
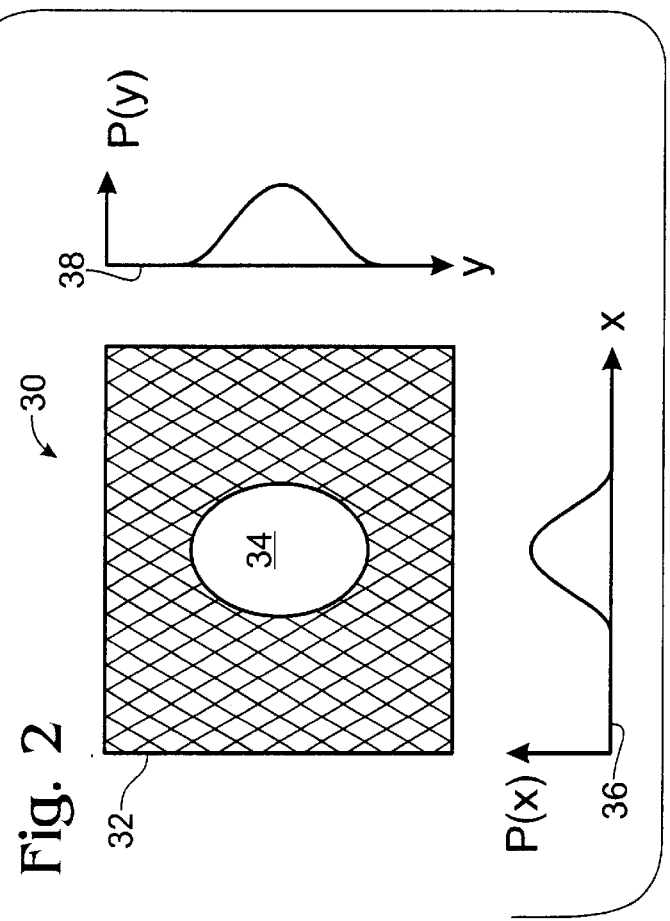

METHOD FOR ROBUST HUMAN FACE TRACKING IN PRESENCE OF MULTIPLE PERSONS

RELATED APPLICATION

This Application claims priority from U.S. Provisional Patent Application 60/090,201 for METHOD FOR ROBUST HUMAN FACE TRACKING IN PRESENCE OF MULTIPLE PERSONS, filed Jun. 22, 1998. This application is related to SYSTEM FOR HUMAN FACE TRACKING, filed Jan. 8, 1998, as Ser. No. 09/004,539.

FIELD OF THE INVENTION

This invention relates to a real-time face tracking technique which may be used in various applications, such as video communication, advanced human-computer interface, digital libraries, and object-based video coding.

BACKGROUND OF THE INVENTION

A number of techniques are known for detecting areas of interest in an image, such as a face or other identified object of interest. Face detection is an area of particular interest, as face recognition has importance not only for image processing, but also for identification and security purposes, and for human-computer interface purposes. A human-computer interface not only identifies the location of a face, if a face is present, it may also identify the particular face, and may understand facial expressions and gestures.

Traditional face detection techniques incorporate a correlation template which computes similarity measurements between a fixed target pattern and multiple candidate image locations. If any part of the similarity measurement exceeds a threshold value, a "match" is declared, which indicates that a face has been located. Location information for the detected face is then provided. Multiple correlation templates may be used to detect major facial sub-features, such as eye shape, nose shape, etc. A related technique is view-based eigen-spaces, which defines a distance measurement based on a parameterizable sub-space of the original image vector space. A face is considered to be detected if the distance measurement is below a predetermined threshold value.

Another face detection technique uses spatial image invariants which compile a set of image invariants peculiar to facial images. The input image is scanned for a positive occurrence of these invariants at all possible locations to determine if a human face is present at any location.

Examples of existing face tracking techniques include techniques that use (1) correlation between adjacent frames; (2) 2D/3D geometrical face models; and (3) illumination models. The existing face tracking algorithms have one or more of the following disadvantages: they are: (1) sensitive to partial occlusions and shadows; (2) sensitive to faceorientation and/or scale changes; (3) sensitive to lighting condition changes; (4) computationally intensive, and therefore difficult to apply to real-time applications; and (5) may require initial positions of the faces.

Specific techniques for face tracking methodologies are disclosed in J. Yang and A. Waibel, Tracking humanfaces in real-time, Proc. IEEE Workshop on Applications of Computer Vision, 1996, which discusses a system that acquires a red-green-blue (RGB) image, and processes the image by filtration to generate a chromatic image (red and green) of pure colors in the absence of intensity, or brightness. This transformation from RGB to RG is a transformation from a three-dimensional space to a two-dimensional space. Distribution of facial colors within the chromatic color space is presumed to be clustered in a small region. The work describes a finding that skin color in chromatic color space has a similar Guassian distribution, regardless of the skin color of an individual and regardless of lighting conditions. A two-dimensional Guassian model is used to map the RGB pixel map onto a chromatic color space (r, g), which is indicative of facial color. Based on the results of the 2D Guassian model, for each pixel within the RGB image, the facial region of the image is determined. The 2D Guassian model is, however, computationally intensive, and therefore too expensive for real-time systems, in spite of the title of the paper. Additionally, the technique uses a very simple tracking mechanism, which may cause the tracked face to become "jittery" during processing;

A Elefheriadis and A. Jacquin, Automatic face location detection and tracking for model-assisted coding of video teleconferencing sequences at low bit-rates, Signal Processing: Image Communication, No. 7, 1995, describe a system for face detection and tracking that is designed for video processing and is suitable for detecting "talking heads," i.e., a head-and-shoulder shot, wherein the person in an image is modeled as an elliptical region of interest. The system presumes that an outline of a human head is generally elliptical and that there is a high temporal correlation from frame to frame. The system determines the difference between the positions of objects in consecutive frames and sets thresholds to identify regions of significant movement, which regions are indicated as non-zero. Regions that are both elliptical in shape and are indicated as non-zero are located and identified as non-zero regions.

G. D. Hager and P. N. Belhumeur, Real-time tracking of image regions with changes in geometry and illumination, Proc. Computer Vision and Pattern Recognition, 1996, discuss a face-tracking system that defines a window and analyzes the brightness, or intensity, of an image in the window. The pattern of the brightness, or intensity, within the window is used to track the object in the window, such as a face, between frames of the sequence. This system is sensitive to face orientation and changes, including partial occlusions and shadows, both of which obscure the pattern of the image, however, the system is unable to initially locate the position of a face in an image.

U.S. Pat. No. 5,642,431 to Poggio et al., granted Jun. 24, 1997, for Network-based system and method for detection of faces and the like, discusses an imaging system that captures an image and classifies the captured image in accordance with patterns generated by a pattern prototype synthesizer.

U.S. Pat. No. 5,450,504 to Calia, granted Sep. 12, 1995, for Method for finding a most likely matching of a target facial image in a data base of facial images, discusses an identification system used to match a subject image with images stored in a data base.

U.S. Pat. No. 5,430,809 to Tomitaka, granted Jul. 4, 1995, for Human face tracking system, discusses a technique for identifying and tracking an object, such as a human face, in an image captured by a video camera.

U.S. Pat. No. 5,280,530 to Trew et al., granted Jan. 18, 1994, for Method and apparatus for tracking a moving object, discusses a technique for face tracking in a videophone application wherein the face is masked to form a template and divided into sub-templates. The next frame of video is analyzed to detect any displacement of the template and sub-templates. Displacements are used to determine affine transform coefficients, ultimately resulting in an updated template and mask.

U.S. Pat. No. 5,187,574 to Kosemura et al., granted Feb. 16, 1993, for Method for automatically adjusting field of view of television monitor system and apparatus for carrying out the same, discusses a security system wherein the size of the head and shoulders of a subject is manipulated to maintain a relatively constant representation on a video monitor.

U.S. Pat. No. 5,164,992 to Turk et al., granted Nov. 17, 1992, for Face recognition system, discusses comparison of members of a group with images in a stored database.

U.S. Pat. No. 5,103,484 to Stafford et al., granted Apr. 7, 1992, for Target aimpoint location, discusses a system in which an image is depicted in skeletal form for purposes of identification.

U.S. Pat. No. 4,991,223 to Bradley et al., granted Feb. 5, 1991, for Apparatus and Method for Recognizing image features using color elements, discusses evaluating a scanned video image to determine, pixel-by-pixel, whether a given pixel is a member of one of a number of image features of interest.

U.S. Pat. No. 4,975,969 to Tal, granted Dec. 4, 1990, for Method and apparatus for uniquely identifying individuals by particular physical characteristics and security system utilizing the same, discusses a system which compares distances between predetermined facial features on a subject, and compares the data to that stored in a data base.

U.S. Pat. No. 4,975,960 to Petajan, granted Dec. 4, 1990, for Electronic facial tracking and detection system and method and apparatus for automated speech recognition, discusses a system for determining speech patterns by analyzing facial movements.

SUMMARY OF THE INVENTION

A method for robust human face tracking in the presence of multiple facial images includes taking a frame from a color video sequence as a current input image; filtering the current input image to form a filtered image; estimating the locations and sizes of faces in the filtered image based on a projection histogram of the filtered image; estimating face motion in the filtered image; and outputting the location and size of the tracked faces within the filtered image.

It is an object of this invention is to provide a face tracking technique that is computationally efficient and may be performed in real-time.

Another object of the invention is to provide a face tracking technique that is robust against partial occlusions and shadows.

A further object of the invention is to provide a face tracking technique that is invariant to facial orientation and changes in scale.

Another object of the invention is to provide a face tracking technique that is less sensitive to lighting condition changes.

Still another object of the invention is to provide a face tracking technique that does not require determination of the initial positions of the tracked faces.

An additional object of this invention is to develop a face tracking technique that is able to track a dominant face when more than one face or other skin-color-like objects occur in the scene.

These and other objects and advantages of the invention will become more fully apparent as the description which follows is read in conjunction with the drawings.

BRIEF DESCRIPTION OF THE DRAWINGS

FIG. 1 is a block diagram of the proposed real-time face tracking method of the invention.

FIG. 2 depicts the technique for estimating face location based on projection histograms.

DETAILED DESCRIPTION OF THE PREFERRED EMBODIMENT

Figure 3:
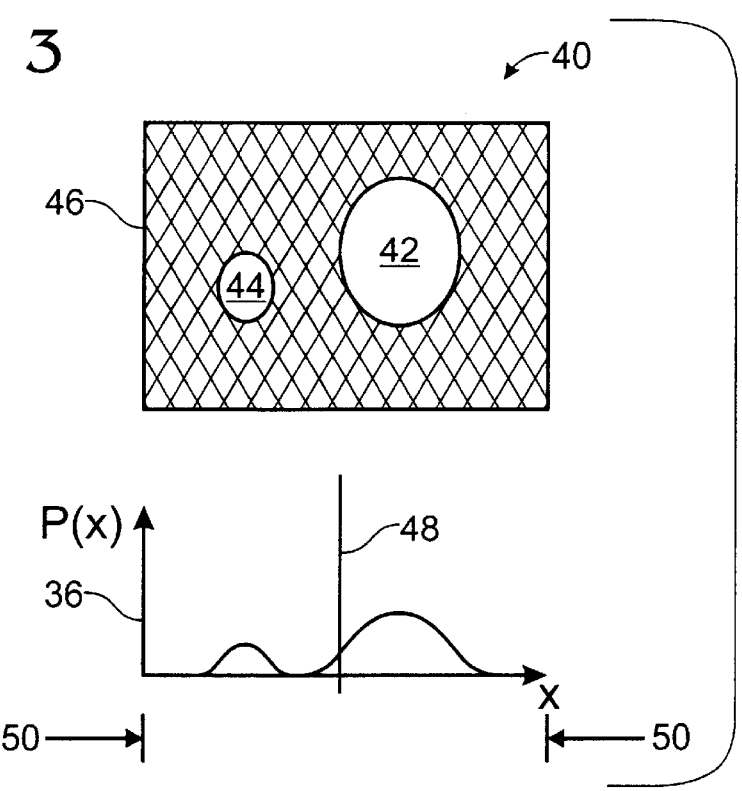
FIG. 3 depicts a step in the method of the invention for estimating face center position based on robust means of the one-dimensional histogram.

The invention provides a method of using color-based filtering in combination with a motion estimation technique, using a linear Kalman filter, to overcome the previously identified prior-art problems. The invention further provides an improved method to track a dominant face in the case where more than one face, or other skin-color-like objects, occurs in the scene. The face tracking system of the invention is insensitive to partial occlusions and shadows, is insensitive to face orientation and/or changes in scale, is insensitive to changes in lighting conditions, is easy to calibrate, and is able to determine the initial position of a face.

Referring now to FIG. 1, the method of the invention 10 takes a frame from a color video sequence, as captured by a video capture device 12, such as a still or video camera, as current input image 14, in, for instance, the red-green-blue (RGB) color space. The image is filtered, 16, in chromaticity space, red-green (r, g). Any face locations in the image are estimated, 18, based on the filtered result. Face motion is then estimated, in the preferred embodiment, via a linear Kalman filter 20. The tracked face regions are extracted and output, 22.

Image 14 may be represented by other color formats, such as cyan, magenta, and yellow (CMY); luminance, intensity and chromaticity (YIQ); hue, saturation and intensity; hue, lightness and saturation; and hue, value and chroma. While the RGB system may not be the best system for representing skin-color, the human visual system adapts to different intensity, or brightness, levels and various illumination sources such that a perception of color constancy is maintained within a wide range of environmental lighting conditions. In the RGB color space, the colors R, G, and B represent not only the color but also include an intensity component, making the RGB color space more perceptible to the human visual system. For example, if the corresponding elements of two pixels, R1, G1, B1, and R2, G2, B2, are proportional, i.e., $$\frac{R1}{R2} = \frac{G1}{G2} = \frac{B1}{B2},$$

then the two pixels characterize the same color at different intensities. As a result, it is desirable to reduce the intensity information from the color representation, while preserving accurate low dimensional color information. Because intensity is not important for characterizing skin colors under normal lighting conditions, image 14 is transformed by filter 16 to chromatic color space. Any suitable transformation may be used, so long as the result is a representation in a color space where the dependence on intensity is reduced, especially in the RGB color space. Chromatic colors (r, g), are known as pure colors in the absence of intensity.

The chromaticity space (r, g) is defined as follows:

$$r = \frac{R}{R+G+B}, g = \frac{G}{R+G+B}.$$

The skin color may be modeled as a 2D isotropic cluster $C(r_c, g_c, d)$ in the chromaticity space where $(r_c, g_c)$ define the center of the cluster and (d) defines its radius. The color filtering process maps a pixel (R, G, B) in input image I (14) to "1" if the pixel falls within the prescribed skin color cluster in the chromaticity space, and to "0" if it falls outside of the cluster. This results a binary image B(I) which has most of the face pixels marked as 1's and most of the background pixels marked as 0's. A binary image is represented at 30 in FIG. 2, wherein a dark region 32 represents the "0" pixels in the background and a light area 34 represents the "1" pixels in the facial region.

As shown in FIG. 2, the method estimates the locations of faces based on the color filtered result B(I), from two one-dimensional (1D) histograms 86, 38, obtained by projecting B(I) along the x and y directions, respectively. In the related application, identified herein above, the center position and size of a tracked face is estimated based on the means and standard deviations of these histograms. The distribution of skin colors of people are clustered in chromatic color space. Although skin color of different people appears to vary over a wide range, the actual differences are in intensity rather than in true color. The skin color of different people are actually quite similar, it is the intensity that we perceive as different colors. Filtration step 16 is provided to (1) facilitate a distinction between skin tones and other objects in a frame, and (2) detect skin tones regardless of the perceived color of a person's skin, which skin tone varies from person-to-person and also varies for the same person under different lighting conditions. A suitable filter facilitates the ability of the system to track the face(s) in an image regardless of lighting conditions and regardless of skin tone as perceived by the human visual system.

However, the face center position and size estimated from sample means and standard deviations may be biased in the case where more than one face or other skin-color-like objects occur in the scene. It is therefore a purpose of this invention to provide a method to address this problem. This invention describes robust routines to achieve robust measurements or face center position and size, wherein an image contains multiple faces.

Referring to FIG. 3, a binary image 40, having a dominant (largest) facial area 42 and a non-dominant (smaller) facial area 44 is depicted. Facial areas 42, 44 are depicted on a background 46. The center position of a dominant face in the input image is estimated based on the robust, or trimmed, means of the two 1D projection histograms in the x and y directions, 36, 38, respectively. The routine for obtaining the robust mean of an 1D distribution is described as follows:

Step 1. Determining a sample mean $\mu$ 48 and standard deviation a using all of the samples in the distribution 50.

Figure 4:
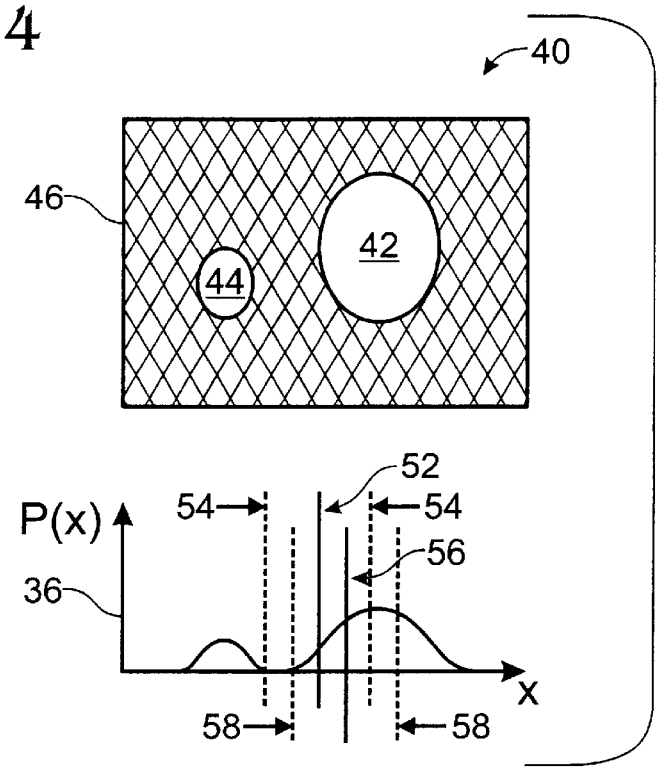
FIG. 4 depicts a later step in the method of the invention.

Step 2. Referring to FIG. 4, let $\mu_t(0)=\mu$ and $\delta$=max (a*$\sigma$, b*image-width) where a and b are scaling factors, e.g., a=1.0 and b=0.2, resulting in an initial trimmed mean $\mu(k)$ 52 which is used to define an initial trimmed interval (k) 54.

Step 3. Determine a trimmed mean $\mu_t(k+1)$ 56 based on the samples within the interval $[\mu_t(k)-\delta, \mu_t(k)+\delta]$ 54.

Step 4. Repeating Step 3 until $|\mu_t(k+1)-\mu_t(k)|<\epsilon$ where $\epsilon$ is tolerance, e.g., $\epsilon$=1.0.

Figure 5:
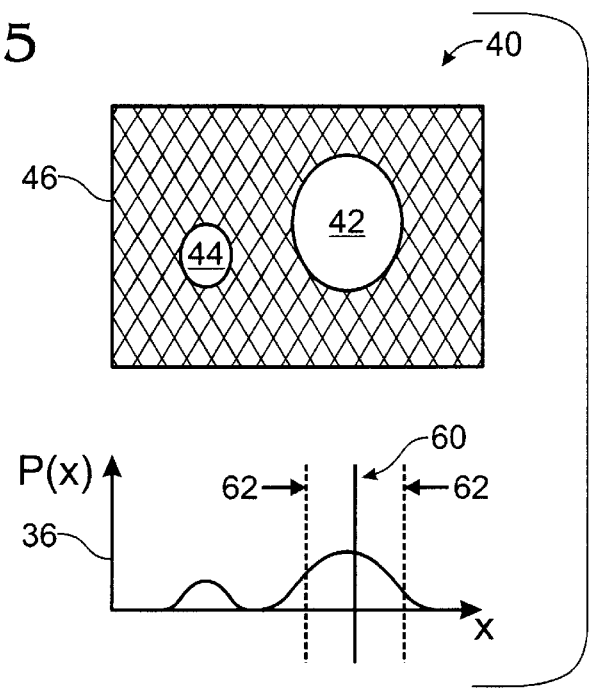
FIG. 5 depicts a final step in the method of the invention.

Step 5. Referring to FIG. 5, the robust mean $\mu^*$60, is the final converged trimmed mean within a final trimmed interval 62.

In addition to robust face-center measurements, the issue of robust size measurements is addressed. Four methods which yield robust size measurements compared to the previously described sample standard deviation are disclosed. A trimmed standard deviation calculation is the basis of the first two methods. The third method uses the center information in conjunction with the orthogonal projection to determine the size, and the fourth method involves re-projecting in a neighborhood of the located center. The four methods will now be described.

Given the robust mean $\mu^*$ and $\delta$ from the center location routine, the first method for finding the size of a face in either the x or y direction is:

Step 1. Determining the trimmed standard deviation $\sigma_t$ based on the samples within the interval $[\mu^*-\delta, \mu^*+\delta]$.

Step 2. Let size=c*$\sigma_t$ where c is a scaling factor, e.g., c=2.0.

The above method may underestimate the size if the initial $\delta$ is too small. In order to correct for this, the following second method is also based on the trimmed standard deviation. Given the robust mean $\mu^*$ and $\delta$ from the center location routine and the projection histogram h.

Step 1. Determining the trimmed standard deviation $\sigma_t$ based on the samples within the interval $[\mu^*-\delta, \mu^*+\delta]$.

Step 2. If $h(\mu^*+d^*\sigma_t) \geq g^*h(\mu^*)$ or $h(\mu^*-d^*\sigma_t) \geq \mu^*h(\mu^*)$ where, e.g., d=1.0 and g=0.4, then increase $\sigma_t$ until the condition is no longer true.

Step 3. Let size=c*$\sigma_t$ where c is a scaling factor, e.g., c=2.0.

The basis for the third method is the observation that the value of the projection histogram at the x or y center location is, in the case of perfect color filtering, the height of the face in the y direction or the width of the face in the x direction, respectively. Given the robust means $\mu_x^*, \mu_y^*$ and $\delta$ from the center location routines and the projection histograms $h_x$ and $h_y$:

Let $$width = \frac{1}{(2N+1)} \sum_{i=-N}^{N} h_y(\mu_y^* + i) \quad \text{and}$$

$$height = \frac{1}{(2N+1)} \sum_{i=-N}^{N} h_x(\mu_x^* + i)$$

where N determines the number of samples used in the calculation.

In the fourth method, the size from a projection histogram of a clipped region of the color-filtered image is calculated. Given the robust mean $\mu_x^*$ in the x direction, for example, Step 1. Form the clipped projection histogram $h_y^c$ by projecting columns in the color-filtered image within the range $[\mu_x^*-\Delta, \mu_x^*+\Delta]$, where $\Delta$ determines the number of samples used in the calculation.

Step 2. Calculate size in the y direction based on $h_y^c$ using method 1 or 2 above or by sample standard deviation as previously proposed.

The estimated face locations are then used for tracking. For this method, the motion of a tracked face may be modeled as a piece-wise constant 2D translation within the image plane. A linear Kalman filter may be used to smooth and predict the 2D translation velocity vector ($v_x$, $v_y$) of a tracked face. The smoothed velocity may finally be used to determine the tracked position of a face. The system model for tracking motion is:

$$x(k+1)=F(k)x(k)+w(k)$$

$$z(k+1)=H(k+1)x(k+1)+v(k+1)$$

where x(k) is the true velocity vector to be estimated, z(k) is the observed instantaneous velocity vector, w(k), v(k) are white noise, and F (k)=I, H (k)=I for piece-wise constant motion. The Kalman predictor is:

$$\hat{x}(k+1|k)=P(k)\hat{x}(k|k), \hat{x}(0|0)=0$$

$$\hat{z}(k+1|k)=H(k+1)\hat{x}(k+1|k)$$

The Kalman corrector is:

$$\hat{x}(k+1|k+1)=\hat{x}(k+1|k)+K(k+1)\Delta z(k+1|k)$$

$$\Delta z(k+1|k)=z(k+1)-\hat{z}(k+1|k)$$

where $K(k+1)$ is the Kalman gain. The Kalman gain is computed as:

$$K(k+1)=P(k+1|k)H^T(k+1)[H(k+1)P(k+1|k)H^T(k+1)+R(k+1)]^{-1}$$

The covariances are computed as:

$$P(k+1|k)=F(k)P(k|k)F^T(k)+Q(k), P(0|0)=P_0$$

$$P(k+1|k+1)=[I-K(k+1)H(k+1)]P(k+1|k)$$

where, $P(k)=E[w(k)w^T(k)]$, $R(k)=E[v(k)v^T(k)]$ and $P_0=E[x(0)x^T(0)]$.

Multiple face detection and tracking is easily accomplished using the techniques proposed in this invention. After a face is detected, the region it occupies in the projection histogram is masked out, and and the process of choice for location and size determination is repeated for subsequent faces.

The method of the invention is implemented in C++ and run on Sun® work stations. Experimental results verify that the method runs fully automatically at an average speed of 15 frames per second with a video resolution of 320×240. The method successfully tracks faces of different individuals under (1) presence of multiple faces and other skin-color-like objects; (2) partial occlusions and shadows; (3) face orientation and scale changes; and (4) lighting condition changes.

Figure 6:
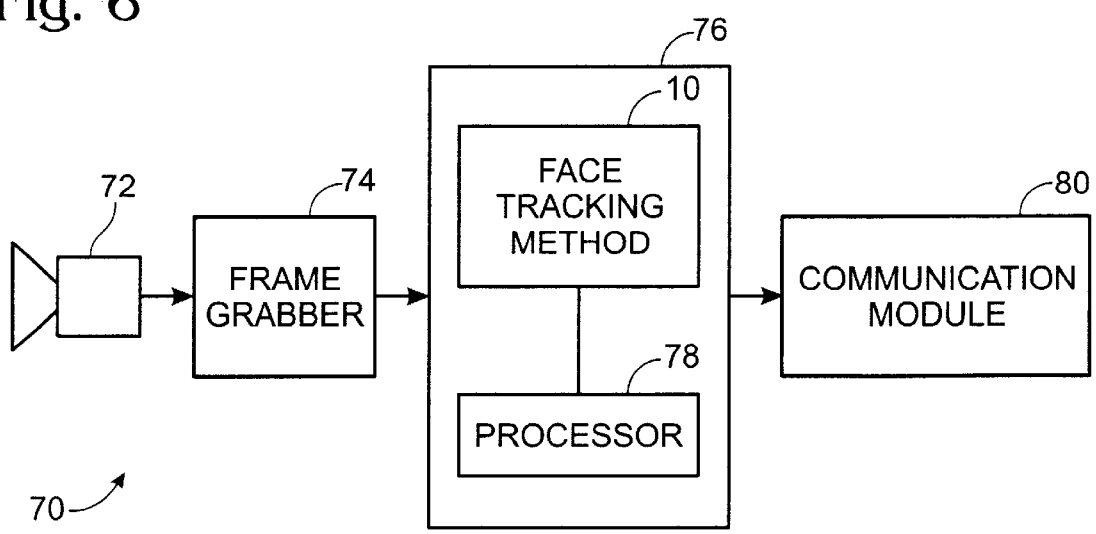
FIG. 6 depicts a system incorporating the method of the invention.

A system constructed according to the invention is depicted generally at 70 in FIG. 6. System 70 is operable for real-time video communication applications, and includes a video camera 72, a video frame grabber 74, a computational device 76, including a processor 78 and computer software and hardware necessary to implement method 10, and communication software and devices 80. The method of the invention enables a user to eliminate or substitute background in the input video sequences. Therefore the system may allocate the entire communication bandwidth to faces.

Although a preferred embodiment of the invention has been described, it will be appreciated that further variations and modifications may be made thereto without departing from the scope of the invention as defined in the appended claims.

We claim:

1. A method for robust human face tracking in the presence of multiple facial images comprising:

taking a frame from a color video sequence as a current input image;

filtering the current input image in chromaticity space;

estimating the locations of faces in the image based on a projection histogram of the filtered image, including: determining a sample mean $\mu$ and standard deviation $\sigma$ using all of the samples in a distribution; setting $\mu_t(0)=\mu$ and $\delta$=max (a*$\sigma$, b*image-width) where a and b are scaling factors, resulting in an initial trimmed mean $\mu_t(k)$ within an initial trimmed interval (k); determining a trimmed mean $\mu_t$ (k+1) which is used to define the interval [$\mu_t(k)-\delta$, $\mu_t(k)+\delta$]; redetermining the trimmed mean until |$\mu_t$ (k+1)−$\mu_t(k)$|<$\epsilon$ where $\epsilon$ is tolerance; and determining a robust mean $\mu^*$ within a final trimmed interval; and extracting and outputting the tracked face regions.

2. The method of claim 1 wherein said filtering includes filtering to represent the current input image in chromaticity space.

3. The method of claim 1 which includes estimating face motion via a linear Kalman filter.

4. The method of claim 3 which further includes smoothing the face motion during a post-processing step.

5. A method for robust human face tracking in the presence of multiple facial images comprising:

taking a frame from a color video sequence as a current input image;

filtering the current input image in chromaticity space;

estimating the locations of faces in the image based on a projection histogram of the filtered image;

determining the size of a facial area by:

determining the trimmed standard deviation $\sigma_t$ based on the samples within the interval [$\mu^*-\delta$, $\mu^*+\delta$]; and setting size=c*$\sigma_t$ where c is a scaling factor; and extracting and outputting the tracked face regions.

6. The method of claim 5 wherein said filtering includes filtering to represent the current input image in chromaticity space.

7. The method of claim 5 which further includes estimating face motion via a linear Kalman filter.

8. The method of claim 7 which further includes smoothing the face motion during a post-processing step.

9. A method for robust human face tracking in the presence of multiple facial images comprising:

taking a frame from a color video sequence as a current input image;

filtering the current input image in chromaticity space;

estimating the locations of faces in the image based on a projection histogram of the filtered image determining the size of a facial area by:

determining the trimmed standard deviation $\sigma_t$ based on the samples within the interval [$\mu^*-\delta$, $\mu^*+\delta$];

If $h(\mu^*+d^*\sigma_t) \geq g^*h(\mu^*)$ or $h(\mu^*-d^*\sigma_t) \geq g^*h(\mu^*)$ where, e.g., d=1.0 and g=0.4, then increase $\sigma_t$ until the condition is no longer true; and setting size=c*$\sigma_t$, where c is a scaling factor; and extracting and outputting the tracked face regions.

10. The method of claim 9 wherein said filtering includes filtering to represent the current input image in chromaticity space.

11. The method of claim 9 which further includes estimating face motion via a linear Kalman filter.

12. The method of claim 11 which further includes smoothing the face motion during a post-processing step.

13. A method for robust human face tracking in the presence of multiple facial images comprising:

taking a frame from a color video sequence as a current input image;

filtering the current input image in chromaticity space;
estimating the locations of faces in the image based on a projection histogram of the filtered image
determining the size of a facial area by:
setting $$width = \frac{1}{(2N+1)} \sum_{i=-N}^{N} h_y(\mu_y^* + i);$$

and
setting $$height = \frac{1}{(2N+1)} \sum_{i=-N}^{N} h_x(\mu_x^* + i),$$

wherein N determines the number of samples used in the determination of the size of the facial image; and
extracting and outputting the tracked face regions.

14. The method of claim 13 wherein said filtering includes filtering to represent the current input image in chromaticity space.

15. The method of claim 13 which further includes estimating face motion via a linear Kalman filter.

16. The method of claim 9 which further includes smoothing the face motion during a post-processing step.

17. A method for robust human face tracking in the presence of multiple facial images comprising:

taking a frame from a color video sequence as a current input image;

filtering the current input image in chromaticity space;

estimating the locations of faces in the image based on a projection histogram of the filtered image determining the size of a facial area by determining the size from a projection histogram of a clipped region of the color-filtered image by:

forming the clipped projection histogram $h_y^c$ by projecting columns in the color-filtered image within the range $[\mu_x^* - \Delta, \mu_x^* + \Delta]$, where $\Delta$ determines the number of samples used in the determination;

determining size in the y direction based on $h_y^c$; and estimating face locations for tracking facial motion; and extracting and outputting the tracked face regions.

18. The method of claim 17 wherein said filtering includes filtering to represent the current input image in chromaticity space.

19. The method of claim 17 which further includes estimating face motion via a linear Kalman filter.

20. The method of claim 19 which further includes smoothing the face motion during a post-processing step.

* * * * *